United States Patent
Takato et al.

(10) Patent No.: US 10,279,852 B2
(45) Date of Patent: May 7, 2019

(54) VEHICLE SPOILER

(71) Applicant: TOYOTA JIDOSHA KABUSHIKI KAISHA, Toyota-shi, Aichi-ken (JP)

(72) Inventors: Satoshi Takato, Nagoya (JP); Tatsuya Shimizu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/892,512

(22) Filed: Feb. 9, 2018

(65) Prior Publication Data

US 2018/0229781 A1 Aug. 16, 2018

(30) Foreign Application Priority Data

Feb. 13, 2017 (JP) ................................. 2017-024090

(51) Int. Cl.
*B62D 35/00* (2006.01)

(52) U.S. Cl.
CPC ................................. *B62D 35/005* (2013.01)

(58) Field of Classification Search
CPC ........ B62D 35/005; Y02T 10/82; B60R 21/36

USPC ...................................................... 296/180.5
See application file for complete search history.

(56) References Cited

U.S. PATENT DOCUMENTS

| | | | |
|---|---|---|---|
| 9,150,175 B1* | 10/2015 | Farooq | B60R 21/34 |
| 9,221,411 B2* | 12/2015 | Rick | B60R 19/205 |
| 2013/0119681 A1* | 5/2013 | Mendis | B60R 21/36 |
| | | | 293/107 |
| 2014/0175831 A1 | 6/2014 | Hoelzel et al. | |

FOREIGN PATENT DOCUMENTS

| | | |
|---|---|---|
| JP | H07-23667 U | 5/1995 |
| JP | 2007-22149 A | 2/2007 |
| JP | 2014-84104 A | 5/2014 |

* cited by examiner

*Primary Examiner* — Pinel E Romain
(74) *Attorney, Agent, or Firm* — Oliff PLC (57) ABSTRACT

Provided is a vehicle spoiler including a front spoiler provided on a vehicle lower side of a front bumper, an air bag, which is connected with a bottom part of the front bumper and the front spoiler, causes the front spoiler to be in a deployed state by expanding, and causes the front spoiler to be in a stored state by contracting, and a relief valve that reduces inner pressure of the air bag when inner pressure of the air bag increases due to interference of an obstacle on a road with the front spoiler.

7 Claims, 6 Drawing Sheets

VEHICLE SPOILER

INCORPORATION BY REFERENCE

The disclosure of Japanese Patent Application No. 2017-024090 filed on Feb. 13, 2017 including the specification, drawings and abstract is incorporated herein by reference in its entirety.

BACKGROUND

1. Technical Field

The disclosure relates to a vehicle spoiler.

2. Description of Related Art

In, for example, Japanese Patent Application Publication No. 2014-084104 (JP 2014-084104 A), a tiltable front spoiler is disclosed, which is provided on a vehicle lower side of a front bumper. The front spoiler is changed between a deployment position (deployed state) and a stored static position (stored state) by expanding and contracting an air bag provided between the front spoiler and a bottom part the front bumper.

SUMMARY

Here, when a vehicle provided with the front spoiler according to JP 2014-084104 A passes an obstacle on a road, there is an instance where the obstacle on the road interferes with the front spoiler in the deployment position. Then, at the time of the interference, the front spoiler and the air bag are deformed and thus end the interference when a load on the front spoiler is small. However, when a load is great, the front spoiler and the air bag do not deform sufficiently, and the front spoiler is damaged.

The disclosure provides a vehicle spoiler that restrains a front spoiler from being damaged when the front spoiler interferes with an obstacle on a road.

A vehicle spoiler according to a first aspect of the disclosure includes a front spoiler disposed on a vehicle lower side of a front bumper, an air bag, which is connected with a bottom part of the front bumper and the front spoiler, causes the front spoiler to be in a deployed state by expanding, and causes the front spoiler to be in a stored state by contracting, and a relief valve that reduces inner pressure of the air bag when inner pressure of the air bag increases due to interference of an obstacle on a road with the front spoiler.

According to the above aspect, when inner pressure of the expanded air bag increases due to interference of an obstacle on a road with the front spoiler in the deployed state, it is possible to change the front spoiler to the stored state by releasing air from the air bag to reduce inner pressure. This means that, by changing from the deployed state to the stored state at the time of interference with an obstacle on a road, it is possible to restrain the front spoiler from being damaged.

In the above aspect, the relief valve may be disposed in the air bag on a vehicle upper side.

If the relief valve is provided in the air bag so as to project on the vehicle lower side, damage can happen due to interference with an obstacle on a road. However, according to the foregoing aspect, it is possible to restrain the relief valve from being damaged due to interference with an obstacle on a road.

In the above aspect, the relief valve may be arranged inside space surrounded by the front spoiler, the bottom part of the front bumper, and the air bag in the deployed state.

According to the above aspect, since the relief valve is arranged inside the space closed by the front spoiler, the bottom part of the front bumper, and the air bag, it is possible to restrain foreign matters from entering the relief valve.

In the above aspect, the relief valve may be disposed in the air bag so as to be closer to a connecting part that connects the air bag and the front spoiler.

In the air bag, the closer it is to the connecting part that connects the air bag and the front spoiler where external force is input, the earlier inner pressure changes in response to a change of the external force. Thus, according to the foregoing aspect, since the relief valve opens immediately after the front spoiler interferes with an obstacle on a road, the front spoiler is changed to the stored state in an early stage.

A vehicle spoiler according to a second aspect of the disclosure includes a front bumper, a front spoiler, which has a first end portion that is connected with a vehicle lower side of the front bumper, has flexibility, and is formed into a bent state towards a vehicle rear side, an air bag connected between a bottom part of the front bumper and a second end portion of the front spoiler, and a relief valve that opens when inner pressure of the air bag exceeds a given value.

In the above aspect, the air bag may expands, and the front spoiler may be a deployed state.

In the above aspect, when the air bag expands, the air bag may press the second end portion of the front spoiler and deform the front spoiler to a deployed state.

According to the above aspect, it is possible to obtain a vehicle spoiler that restrains the front spoiler from being damaged when the front spoiler interferes with an obstacle on a road.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle spoiler 10 according to an embodiment of the disclosure is explained based on FIG. 1 to FIG. 4B. An arrow FR, an arrow UP, an arrow RH, and an arrow LH stated in each drawing as appropriate respectively show a front direction, an upper direction, and right and left directions as a vehicle width direction, of a vehicle 12, to which the vehicle spoiler 10 is applied. Hereinafter, the upper-lower and front-rear directions, and the vehicle width directions simply correspond to the respective arrow directions described above.

Figure 1:
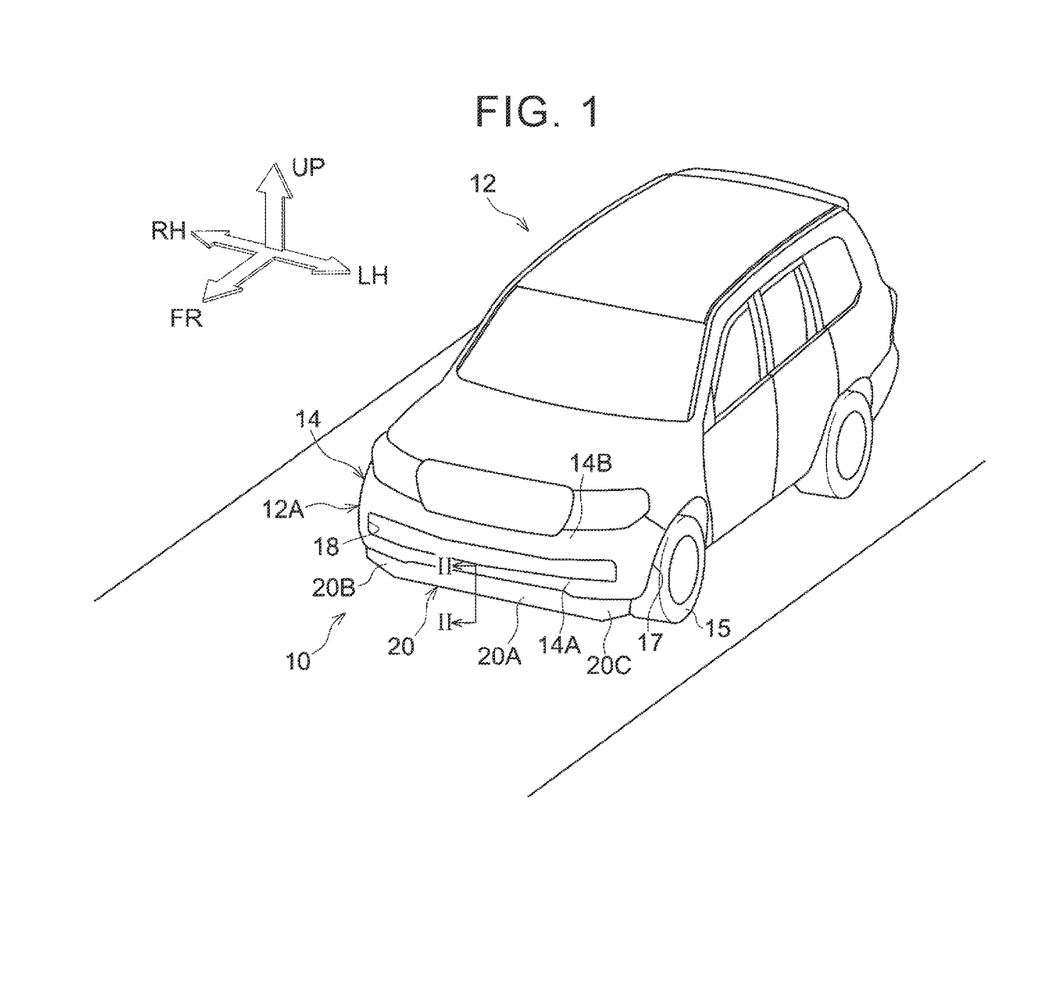
FIG. 1 is a perspective view from an obliquely front side of a vehicle, showing a front part of the vehicle to which a vehicle spoiler according to an embodiment of the disclosure is applied.

First, a structure of the vehicle spoiler is explained. As shown in FIG. 1, a front bumper 14 is provided in a front end part 12A of the vehicle 12 along the vehicle width direction. The front bumper 14 is fixed to the vehicle body side by fixing means (not shown).

The front bumper 14 is formed using, for example, resin, and its sectional shape, which is taken along the vehicle front-rear direction, is a generally U-shape that is open on the vehicle rear side (not shown). The front bumper 14 includes a front wall part 14A serving as a design surface, an upper wall part 14B, which bends towards the vehicle rear side from an upper end portion of the front wall part 14A and is fixed to a vehicle body side, and a lower wall part 14C (see FIG. 2), which bends towards the vehicle rear side from a lower end portion of the front wall part 14A.

The front wall part 14A is formed along the vehicle width direction, and has a gently-sloping curved surface that expands slightly towards the vehicle front side. In a center part of the front wall part 14A in the vehicle width direction, a front grill 18 is provided. Further, outer end portions of the front wall part 14A are formed so as to go around to vehicle side parts along the vehicle front-rear direction, and rear end portions of the front wall part 14A form parts of wheel houses 17.

Figure 2:
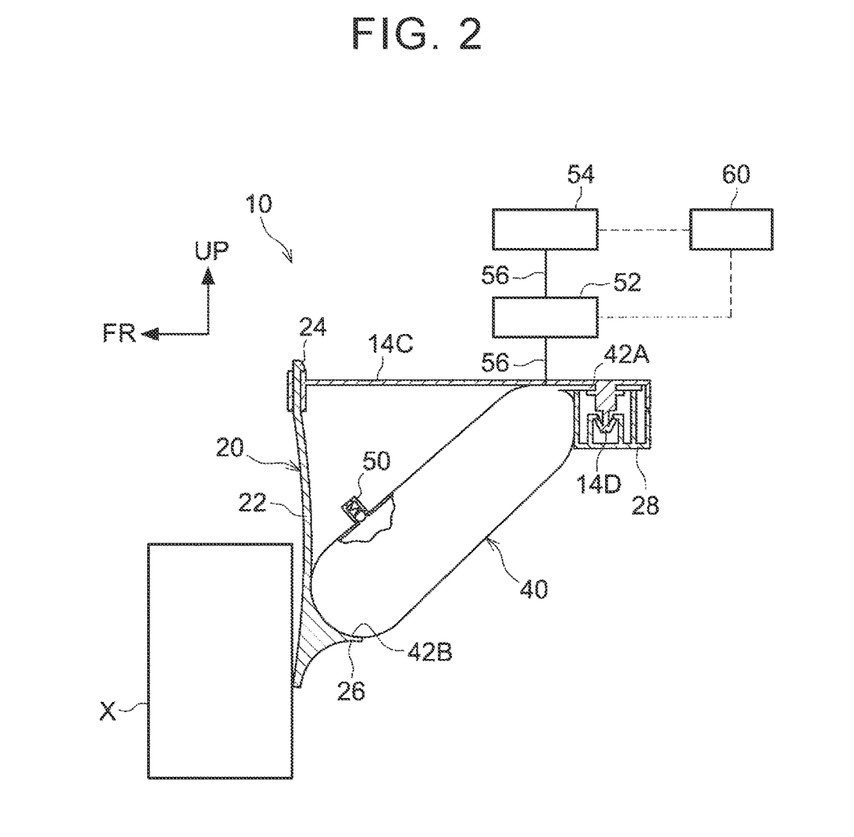
FIG. 2 is a sectional view (a sectional view taken along the line II-II in FIG. 1) of a front spoiler in a deployed state in the vehicle spoiler according to the embodiment of the disclosure.

Here, as shown in FIG. 2, the lower wall part 14C serving as a bottom part of the front bumper 14 structures a horizontal wall surface towards a vehicle rear side. A plate-shaped front spoiler 20 made of resin is provided along the vehicle width direction from the lower wall part 14C towards the vehicle lower side. In a front view from the vehicle front side, a center part 20A of the front spoiler 20 has a generally rectangular shape, and a right end part 20B and a left end part 20C formed continuously from the center part 20A towards both end sides, respectively, are formed into a trapezoidal shape in which a width in the vehicle upper-lower direction becomes smaller towards the outer sides in the vehicle width direction (see FIG. 1). Here, the front spoiler 20 according to this embodiment is able to change between a deployed state (see FIG. 2) and a stored state (see FIG. 3). In the deployed state, the front spoiler 20 is deployed so as to be generally upright towards the vehicle lower side, with respect to the lower wall part 14C of the front bumper 14. In the stored state, the front spoiler 20 is stored to be generally horizontal along the lower wall part 14C. As the front spoiler 20 falls into the deployed state, air inflow is restrained from going beneath the floor of the vehicle 12 on the vehicle front side of front tires 15 (see FIG. 1).

FIG. 2 shows a sectional view of the front spoiler 20 in the deployed state. The front spoiler 20 includes a front surface part 22 structuring a design surface, a plurality of engaging claws 24 provided in the front surface part 22 on the vehicle upper side, and a connecting part 26 provided in the front surface part 22 on the vehicle lower side. The front surface part 22 is formed so that, when seen from the front side, the center part 20A has a generally rectangular shape, and the right end part 20B and the left end part 20C have a trapezoidal shape whose width in the vehicle upper-lower direction becomes smaller towards the outer sides in the vehicle width direction. Also, in a sectional view in the vehicle width direction, the front surface part 22 is formed so as to be able to be bent from a generally linear shape into a generally L shape (see FIG. 3). The plurality of engaging claws 24 are provided for each of the center part 20A, the right end part 20B, and the left end part 20C, and the engaging claws 24 project towards the vehicle upper side from an upper end of the front surface part 22. As the engaging claws 24 are inserted into and engaged with holes formed in the lower wall part 14C of the front bumper 14, the front spoiler 20 on the vehicle upper side is fixed to the front bumper 14. Meanwhile, the connecting part 26 is formed so as to have a triangle section that projects towards the vehicle rear direction from the front surface part 22, and a later-described air bag 40 is fixed to a tip part of this projected portion.

Figure 3:
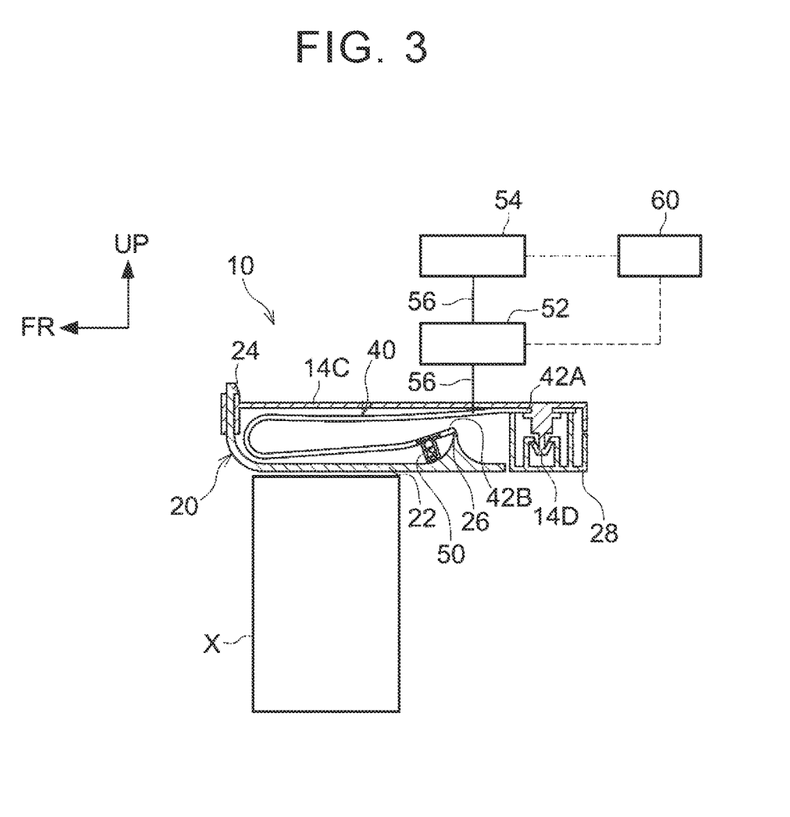
FIG. 3 is a sectional view of the front spoiler in a stored state in the vehicle spoiler according to the embodiment of the disclosure.

FIG. 3 shows a section of the front spoiler 20 in the stored state. In the front spoiler 20 in the stored state, the front surface part 22 extending from the engaging claws 24 towards the vehicle lower side is bent towards the vehicle rear direction, and continues to extend towards the vehicle rear side. Here, a lower surface of the front surface part 22 (the front surface in the deployed state) is a flat surface that forms almost the same plane as a lower surface of a rear edge part 28 that serves as a fixing member of the air bag 40.

As stated above, the front spoiler 20 according to this embodiment is made of resin, and is formed into the shape in the stored state when molded. This means that the front spoiler 20 is molded in a state where the front surface part 22 is bent in a side view. Therefore, in the front spoiler 20, the front surface part 22 becomes a generally linear shape as pressing force is applied to the connecting part 26 towards the vehicle lower and front sides, and, as the pressing force onto the connecting part 26 is released, the front surface part 22 returns to the original bent state due to restoring force.

Figure 4A:
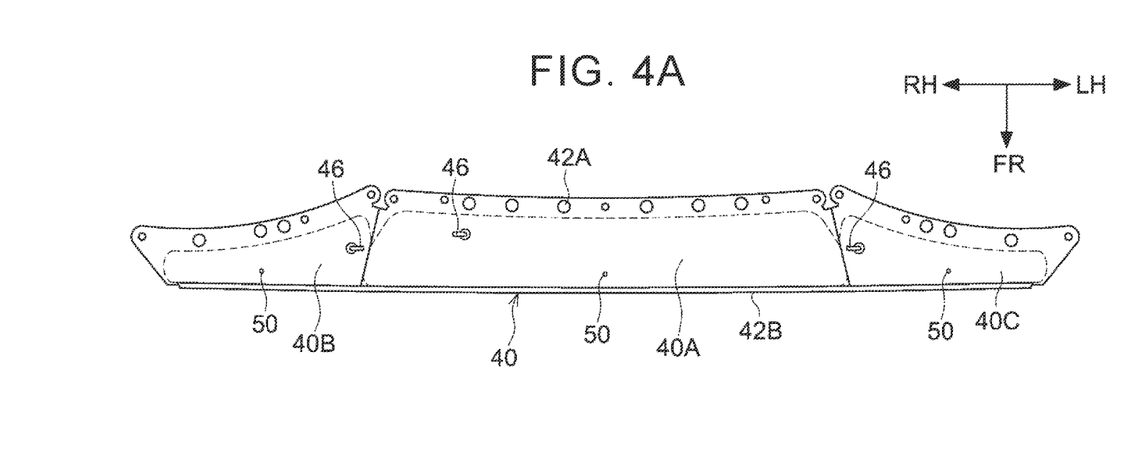
FIG. 4A is a plan view of an air bag in the vehicle spoiler according to the embodiment of the disclosure.
Figure 4B:
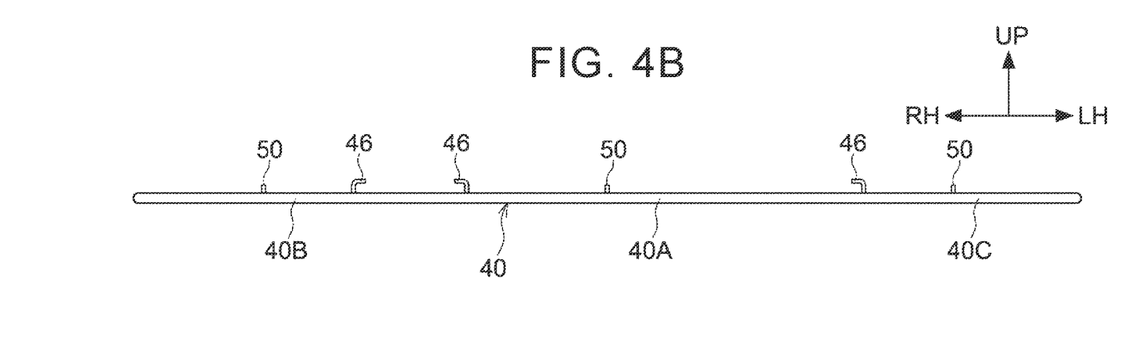
FIG. 4B is the front view of the air bag in the vehicle spoiler according to the embodiment of the disclosure.

As shown in FIG. 2 and FIG. 3, the air bag 40 is an air bag that is connected with the lower wall part 14C of the front bumper 14 and the front spoiler 20, and has a function to cause the front spoiler 20 to be in the deployed state by expanding and cause the front spoiler 20 to be in the stored state by contracting. As shown in FIG. 4A and FIG. 4B, the air bag 40 includes a center air bag 40A corresponding to the center part 20A of the front spoiler 20, a right air bag 40B corresponding to the right end part 20B, and a left air bag 40C corresponding to the left end part 20C.

As shown in FIG. 2, a plurality of fixing holes 42A (see FIG. 4A) are provided in the air bag 40 on the vehicle rear and upper side, and fixing claws 14D provided in the lower wall part 14C of the front bumper 14 are inserted in the fixing holes 42A. Then, as peripheries of the fixing holes 42A are sandwiched by the rear edge part 28, which is a separate member from the front bumper 14, the air bag 40 is connected with the front bumper 14. Further, the air bag 40 is connected with the front spoiler 20 as a fixed end 42B on the vehicle front and lower side is fixed to the connecting part 26 provided in the front spoiler 20. A method for connecting the air bag 40 with the front spoiler 20 may be any method such as a bolt, a rivet, and adhesion. This also applies to a method for connecting the air bag 40 with the front bumper 14.

As stated above, by expanding, the air bag 40 connected with the lower wall part 14C of the front bumper 14 and the front spoiler 20 is arranged from the front spoiler 20 through the lower wall part 14C to the vehicle rear and upper side (see FIG. 2). Also, by contracting, the air bag 40 is arranged between the front surface part 22 of the front spoiler 20 and the lower wall part 14C of the front bumper 14 in a folded fashion (see FIG. 3).

As shown in FIG. 4A and FIG. 4B, on the vehicle upper sides of the center air bag 40A, the right air bag 40B, and the left air bag 40C, tube parts 46 and relief valves 50 are provided, respectively. The tube parts 46 are located in a rightward position in the center air bag 40A in the vehicle width direction, in an inward (leftward) position in the right air bag 40B in the vehicle width direction, and in an inward (rightward) position in the left air bag 40C in the vehicle width direction, respectively. A pipe 56 extended from a later-described control valve 52 is connected with each of the tube parts 46 (FIG. 2).

As shown in FIG. 2, FIG. 4A and FIG. 4B, the relief valves 50 are arranged in generally the center parts of the center air bag 40A, the right air bag 40B, and the left air bag 40C in the vehicle width direction, respectively, on the vehicle front side where a connecting part (the fixed end 42B) connected with the front spoiler 20 is located. Further, in a sectional view of the air bag 40 in the deployed state from the vehicle width direction, the relief valves 50 are arranged in space surrounded by the front spoiler 20, the lower wall part 14C of the front bumper 14, and the air bag 40 (shown in FIG. 2).

The relief valve 50 is set so as to open when inner pressure of each air bag 40 exceeds a given value. Specifically, when inner pressure of the air bag 40 increases due to interference of an obstacle on a road (for example, an obstacle X shown in FIG. 2) with the front spoiler 20, the relief valve 50 is opened in order to reduce the inner pressure of the air bag 40. Further, the relief valve 50 is not opened when inner pressure of the air bag 40 increases due to wind pressure received by the front spoiler 20 while the vehicle 12 is traveling. This means that, in this embodiment, the given value at which the relief valve 50 is opened is set to a value larger than inner pressure of the air bag 40, which is increased due to wind pressure received by the front spoiler 20. As described so far, in this embodiment, the relief valve 50 does not open with wind pressure, but opens at the time of interference with an obstacle on a road.

As shown in FIG. 2, the air bag 40 is connected with the control valve 52 through the pipe 56. Also, the control valve 52 is connected with a pump 54 through the pipe 56. The control valve 52 and the pump 54 are electrically connected with a control part 60, and the control part 60 controls opening and closing of the control valve 52 and also controls driving of the pump 54. In this embodiment, as the control part 60 opens the control valve 52 and also drives the pump 54, the air bag 40 is expanded, in other words, inner pressure of the air bag 40 is increased (see FIG. 2). Further, as the control part 60 opens the control valve 52 while leaving the pump 54 stopped, the air bag 40 is contracted, in other words, inner pressure of the air bag 40 is reduced (see FIG. 3). In the front spoiler 20 according to this embodiment, since the front surface part 22 receives restoring force that attempts to return to the bent state that is made at the time of molding, the air bag 40 is contracted only by opening the control valve 52. Then, as the control part 60 closes the control valve 52, inner pressure of the air bag 40 is maintained. This means that the deployed state and the stored state are maintained.

Next, operations and effects of the vehicle spoiler are explained.

While the vehicle 12 is running at high speed, air inflow is restrained from going underneath the floor as the front spoiler 20 is deployed on the vehicle lower side, thus reducing lifting force and improving travelling stability. On the other hand, when the front spoiler 20 is deployed on the vehicle lower side, a clearance from a road surface is reduced, causing a possibility of interference with an obstacle on the road. Hence, in this embodiment, the front spoiler 20 is changed between the deployed state and the stored state depending on vehicle speed, and, at the same time, the front spoiler 20 is changed from the deployed state to the stored state when the front spoiler 20 in the deployed state interferes with an obstacle on a road. Hereinafter, the operations are explained.

A deploying operation is an operation where the front spoiler 20 is changed from the stored state to the deployed state by control performed by the control part 60. In this embodiment, the deploying operation is carried out when the control part 60 determines that speed of the vehicle 12 exceeds a given value (for example, 60 Km/h).

Specifically, in the stored state shown in FIG. 3, the control part 60 opens the control valve 52, and also drives the pump 54, thereby sending air into the air bag 40 that is contracted and folded. Then, inner pressure of the air bag 40 increases and the air bag 40 is expanded. Accordingly, pressing force is applied to the connecting part 26 of the front spoiler 20 to the vehicle lower and front side, making the front surface part 22 a generally linear shape. This means that the front spoiler 20 is in the deployed state shown in FIG. 2. Then, as the control part 60 closes the control valve 52 and also stops driving the pump 54, the deployed state is maintained. Since the front spoiler 20 is in the deployed state, inflow of air is restrained from going beneath the floor of the vehicle 12, thereby reducing lifting force and improving the travelling stability.

A storing operation is an operation where the front spoiler 20 is changed from the deployed state to the stored state by control performed by the control part 60. In this embodiment, the storing operation is carried out when the control part 60 determines that speed of the vehicle 12 is lower than a given value (for example, 50 Km/h).

Specifically, in the deployed state shown in FIG. 2, as the control part 60 opens the control valve 52 while leaving the pump 54 stopped, air is released from the expanded air bag 40. As stated above, in the front spoiler 20 according to this embodiment, since the front surface part 22 receives restoring force that makes it return to the bent state that is formed at the time of molding, the air bag 40 is contracted only by opening the control valve 52. Then, as inner pressure of the air bag 40 is lowered and the air bag 40 is contracted, pressing force applied to the connecting part 26 of the front spoiler 20 to the vehicle lower and front side is released, and the front surface part 22 returns to the original bent state. This means that the front spoiler 20 is in the stored state shown in FIG. 3. Then, as the control part 60 closes the control valve 52, the stored state is maintained. Because the front spoiler 20 is changed to the stored state, a clearance from a road surface is ensured, thereby restraining interference with an obstacle on the road.

A deforming operation is an operation for changing the front spoiler 20 from the deployed state to the stored state when the front spoiler 20 in the deployed state interferes with an obstacle on a road. The deforming operation is carried out regardless of control by the control part 60.

Specifically, in the deployed state shown in FIG. 2, when the front spoiler 20 of the vehicle 12 interferes with the obstacle X while traveling, external force acts on the connecting part 26 of the front spoiler 20 to the vehicle rear side, and inner pressure of the air bag 40 increases as the external force is input into the air bag 40 from the fixed end 42B.

Then, the relief valve 50 opens, and inner pressure of the air bag 40 is lowered. At the same time, the front surface part 22 of the front spoiler 20 is bent along with contraction of the air bag 40. This means that the front spoiler 20 is changed from the deployed state to the stored state. Then, in the front spoiler 20, since the external force continues to act on the connecting part 26 to the vehicle rear side until the interference with the obstacle X ends, the relief valve 50 remains open and the change to the stored state of the front spoiler 20 continues until the interference with the obstacle X ends.

As described above, in this embodiment, when the vehicle travels while the front spoiler 20 in the deployed state, the front spoiler 20 is not changed to the stored state by wind pressure. However, when there is interference with an obstacle on a road, the front spoiler 20 is changed to the stored state. Thus, even when the front spoiler 20 in the deployed state interferes with an obstacle on a road, it is possible to restrain the front spoiler 20 from being damaged.

In this embodiment, as shown in FIG. 2, the relief valves 50 are provided in the air bag 40 on the vehicle upper side. However, the arrangement of the relief valves 50 is not limited to this.

Figure 5:
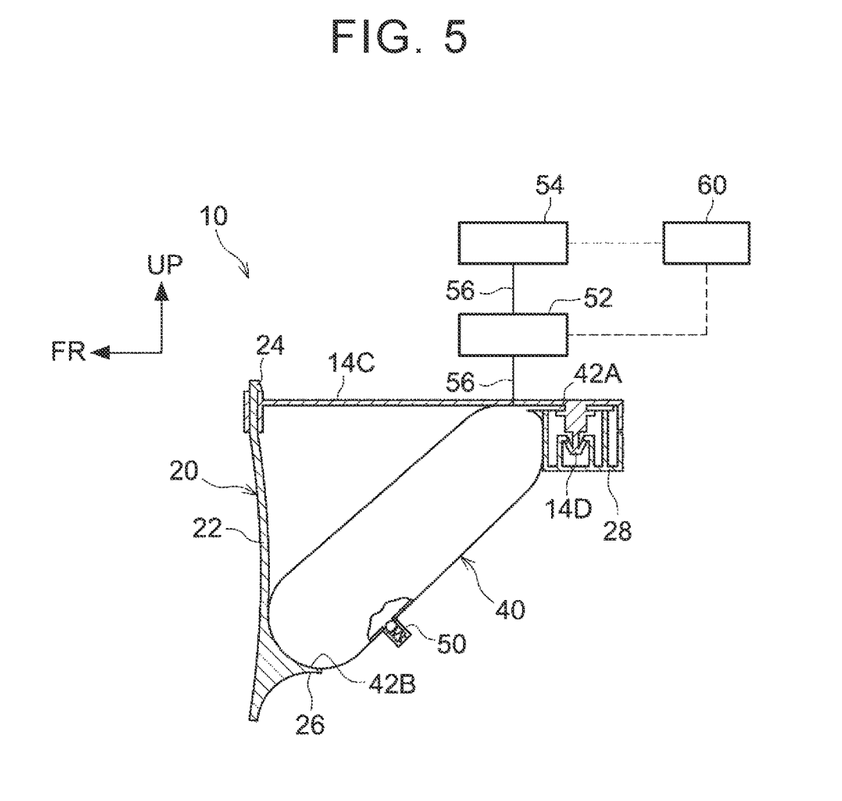
FIG. 5 is a sectional view of a front spoiler in a deployed state in a vehicle spoiler according to modification 1.
Figure 6:
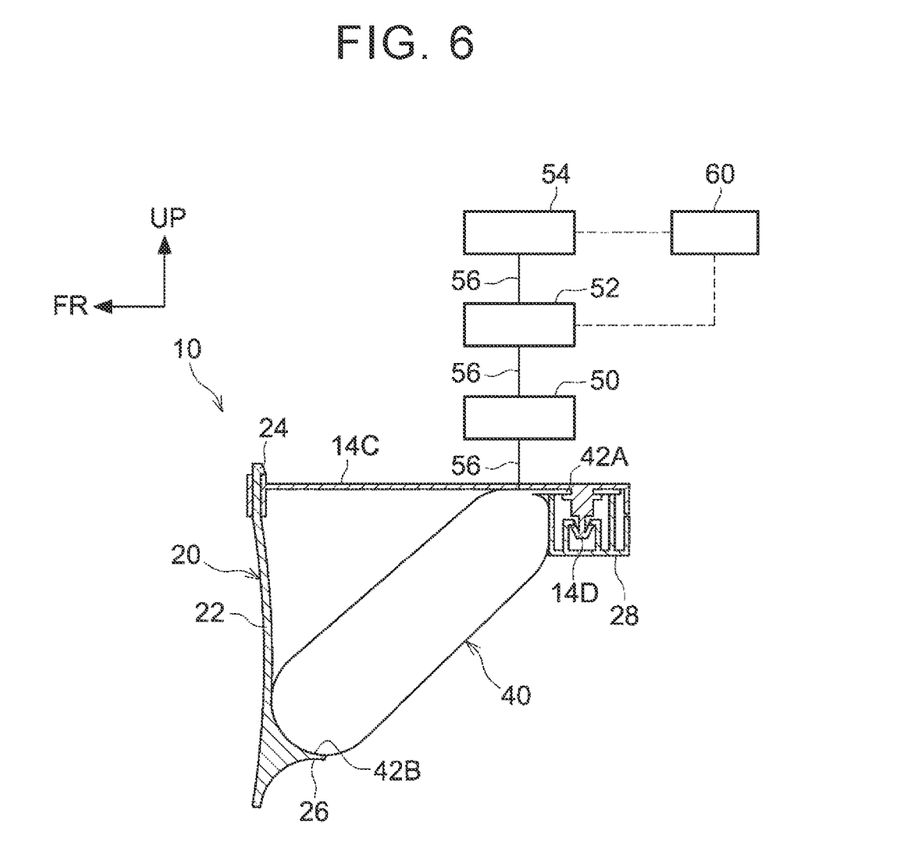
FIG. 6 is a sectional view of a front spoiler in a deployed state in a vehicle spoiler according to modification 2.

For example, as modification 1, as shown in FIG. 5, a relief valve 50 may be provided in an air bag 40 on the vehicle lower side. Also, as modification 2, as shown in FIG. 6, a relief valve 50 may be provided in a middle of a pipe 56 that connects an air bag 40 and a control valve 52. In modifications 1 and 2, similarly to this embodiment, it is possible to restrain a front spoiler 20 from being damaged.

In this embodiment, the front spoiler 20 is provided. The front spoiler 20 is provided on the vehicle lower side of the front bumper 14, and is changed between the deployment position where the front spoiler 20 is deployed on the vehicle lower side, and the stored position where the front spoiler 20 is stored under the front bumper 14. The front spoiler 20 according to this embodiment is a plate-shaped resin member, and as its plate-shaped surface is bent, the lower end portion of the front spoiler 20 moves to the vehicle rear and lower side, realizing the stored state. Also, in this embodiment, the air bag 40 is connected to the lower wall part 14C of the front bumper 14 through the front spoiler 20. As the air bag 40 expands, the front spoiler 20 is brought into the deployed state, and, as the air bag contracts, the front spoiler 20 is brought into the stored state. Then, in this embodiment, the relief valves 50 are provided, which lower inner pressure of the air bag 40 when inner pressure of the air bag 40 increases due to interference of an obstacle on a road with the front spoiler 20.

According to the vehicle spoiler 10 in this embodiment, in a case where inner pressure of the expanded air bag 40 increases because an obstacle on a road interferes with the front spoiler 20 in the deployed state, it is possible to change the front spoiler 20 into the stored state by releasing air from the air bag 40 so as to reduce inner pressure. This means that, by changing from the deployed state to the stored state at the time of interference with an obstacle on a road, it is possible to restrain the front spoiler 20 from being damaged.

Further, the vehicle spoiler 10 according to this embodiment has following characteristics regarding arrangement of the relief valves 50.

First of all, the relief valves 50 according to this embodiment are provided in the air bag 40 on the vehicle upper side. If the relief valves 50 are provided in the air bag 40 so as to project on the vehicle lower side, the relief valves 50 can be damaged due to interference with an obstacle on a road. However, according to this embodiment, it is possible to restrain the relief valves 50 from being damaged due to interference with an obstacle on a road.

Secondly, in the deployed state, the relief valves 50 according to this embodiment are arranged in the space surrounded by the front spoiler 20, the lower wall part 14C of the front bumper 14, and the air bag 40. According to this embodiment, since the relief valves 50 are arranged inside the closed space, it is possible to restrain foreign matters, such as dust and rainwater, from entering the relief valves 50.

Thirdly, the relief valves 50 according to this embodiment are provided closer to the connecting part (the fixed end 42B) that connects the air bag 40 and the front spoiler 20. Here, in the air bag 40, the closer it is to the connecting part (the fixed end 42B), which connects the air bag 40 and the front spoiler 20 where external force is input, the earlier inner pressure changes in response to the external force. Thus, according to this embodiment, since the relief valve 50 opens immediately after interference with an obstacle on a road, the front spoiler 20 is changed to the stored state in an early stage.

The front spoiler 20 according to this embodiment is made of resin and, as being bent, its lower end portion moves towards the vehicle rear and upper side. However, a material for the front spoiler 20 is not limited to this. For example, a material that does not allow bending, such as hard resin, may be used. In such a case, by providing a hinge in the front spoiler on an upper end side, it is possible to move the lower end portion towards the vehicle rear and upper side.

Further, the air bag 40 according to this embodiment is divided into three sections in the vehicle width direction, but the number of divisions and arrangement are not limited to this.

Further, one relief valve 50 according to this embodiment is arranged in each part of the air bag 40 (the center air bag 40A, the right air bag 40B, and the left air bag 40C), but the disclosure is not limited to this. For example, a plurality of relief valves 50 may be provided in one air bag, or one relief valve 50 may be arranged in the plurality of air bags. Further, the number of relief valves 50 arranged in each air bag may be changed.

The embodiment of the disclosure has been explained so far, but the disclosure is not limited to the foregoing. It is obvious that, in addition to the foregoing, it is possible to carry out the disclosure with various modifications made.

What is claimed is:

1. A vehicle spoiler comprising:
   a front spoiler disposed on a vehicle lower side of a front bumper;
   an air bag, which is connected with a bottom part of the front bumper and the front spoiler, causes the front spoiler to be in a deployed state by expanding, and causes the front spoiler to be in a stored state by contracting; and
   a relief valve that reduces inner pressure of the air bag when inner pressure of the air bag increases due to interference of an obstacle on a road with the front spoiler.

2. The spoiler according to claim 1, wherein
   the relief valve is disposed in the air bag on a vehicle upper side.

3. The spoiler according to claim 2, wherein
   the relief valve is arranged inside space surrounded by the front spoiler, the bottom part of the front bumper, and the air bag in the deployed state.

4. The spoiler according to claim 1, wherein
the relief valve is disposed in the air bag so as to be closer to a connecting part that connects the air bag and the front spoiler.

5. A vehicle spoiler comprising:
a front bumper;
a front spoiler including a first end portion that is connected with a vehicle lower side of the front bumper, the front spoiler having flexibility, and the front spoiler formed into a bent state towards a vehicle rear side;
an air bag connected between a bottom part of the front bumper and a second end portion of the front spoiler; and
a relief valve that opens when inner pressure of the air bag exceeds a given value.

6. The spoiler according to claim 5, wherein
the air bag expands, and
the front spoiler is a deployed state.

7. The spoiler according to claim 5, wherein
the air bag presses the second end portion of the front spoiler when the air bag expands, and deforms the front spoiler to a deployed state.

\* \* \* \* \*